United States Patent [19]

Wen et al.

[11] 4,157,959
[45] Jun. 12, 1979

[54] METHOD OF FILTRATION USING CONVERTIBLE (SEMIFLUIDIZED) BEDS

[75] Inventors: Chin-Yung Wen, Morgantown, W. Va.; Liang-Tseng Fan, Manhattan, Kans.

[73] Assignee: Kansas State University Research Foundation, Manhattan, Kans.

[21] Appl. No.: 824,840

[22] Filed: Aug. 15, 1977

[51] Int. Cl.² .................... B01D 33/40; B01D 37/00
[52] U.S. Cl. .......................................... 210/20; 55/79; 210/80; 210/274
[58] Field of Search ............... 23/284, 288 S; 34/10; 55/77, 79; 210/20, 24 R, 35, 80, 81, 82, 269, 274, 275, 293

[56] References Cited

U.S. PATENT DOCUMENTS

| | | | |
|---|---|---|---|
| 2,136,660 | 11/1938 | Martin | 210/80 |
| 3,278,031 | 10/1966 | Rosaen | 210/269 X |
| 3,374,052 | 3/1968 | Fan et al. | 210/24 R X |
| 3,717,251 | 2/1973 | Hampton | 210/80 |
| 3,737,039 | 6/1973 | Hirs | 210/80 |
| 3,846,304 | 11/1974 | Garbo | 210/80 |
| 4,021,339 | 5/1977 | Foody | 210/81 X |

OTHER PUBLICATIONS

Zenz and Othmer, *Fluidization & Fluid-Particle Systems*, 1960, pp. 40 and 41, Reinhold Pub. Corp., New York.
Fan et al., *A. I. Ch. E. Journal*, vol. 5, pp. 407–409, Sep. 1959, "Semifluidization".

*Primary Examiner*—Robert H. Spitzer
*Attorney, Agent, or Firm*—Tilton, Fallon, Lungmus & Chestnut

[57] ABSTRACT

Fine particulates are removed from fluids (gases or liquids) by beds of filter media operated as convertible (semifluidized) beds, wherein the fluidized portion of the bed progressively increases in size during the filtrations. The method has particular application to filtrations which are difficult to carry out by conventional filtrations methods.

8 Claims, 4 Drawing Figures

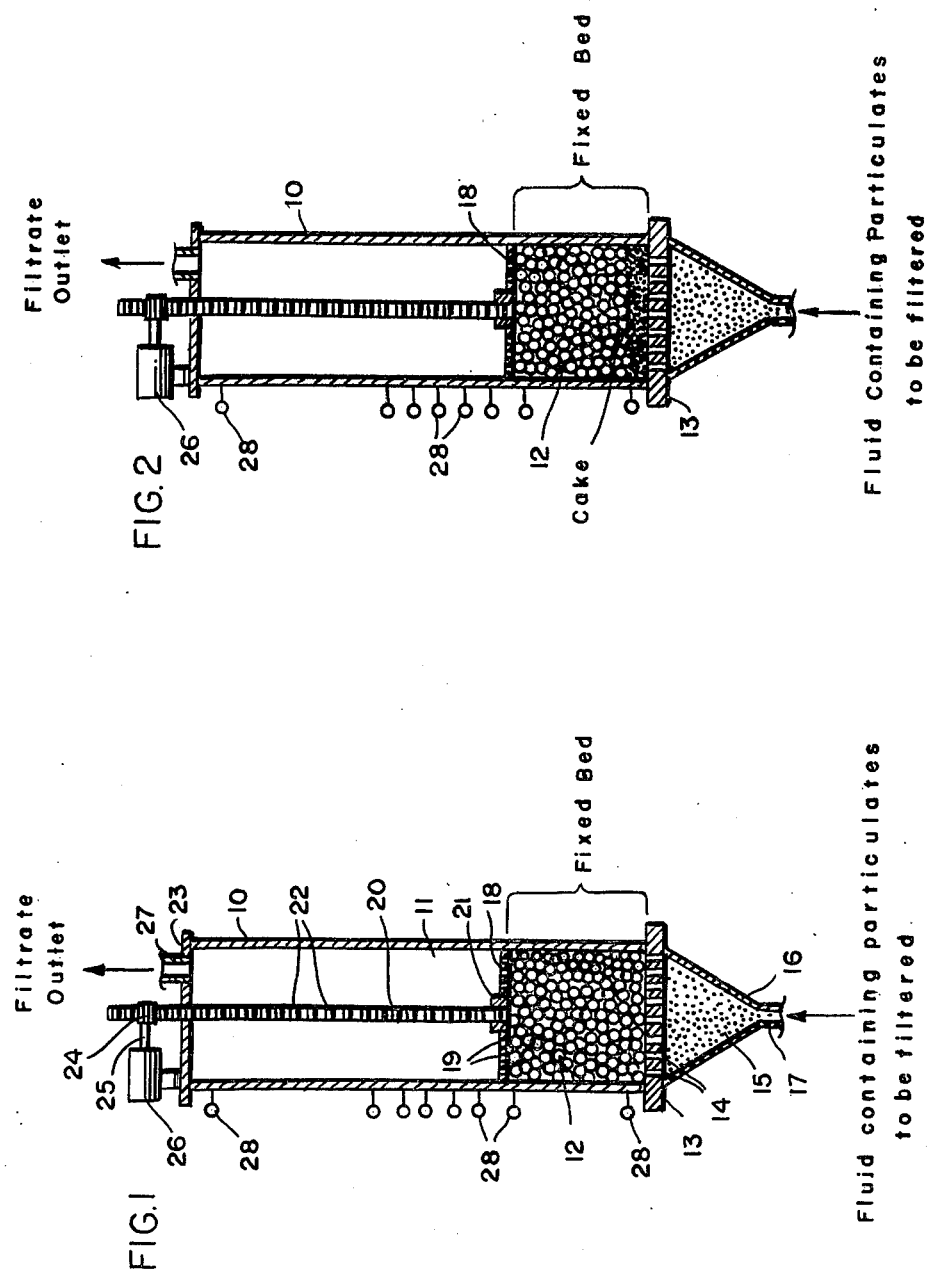

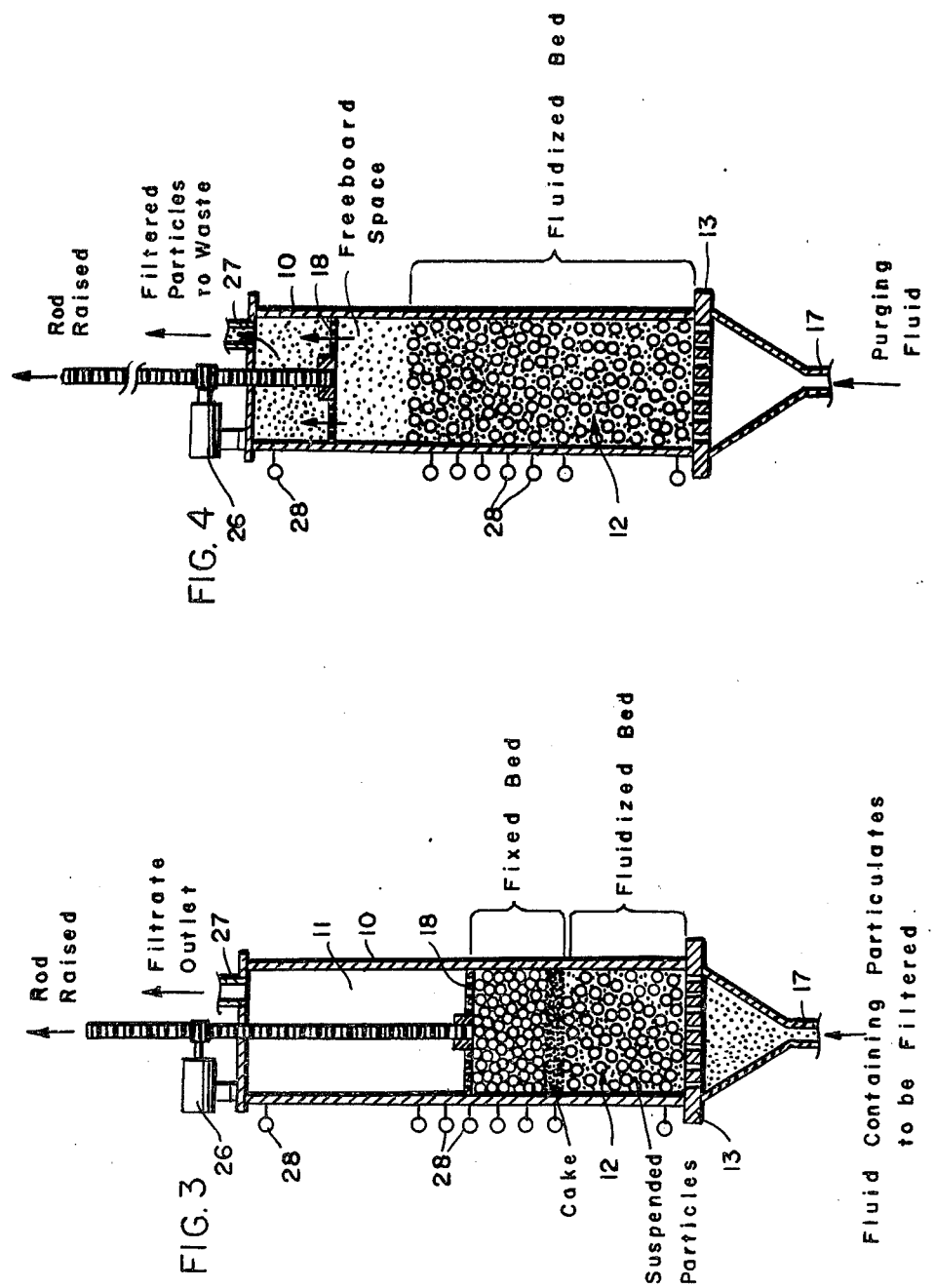

METHOD OF FILTRATION USING CONVERTIBLE (SEMIFLUIDIZED) BEDS

BACKGROUND AND PRIOR ART

Covertible or semifluidized beds are known per se. We previously patented a method of operating such beds for interactions between fluids and the solid particles forming the bed, including both chemical reactions and physical fluid-solid contact processes. (See Fan and Wen U.S. Pat. No. 3,374,052, issued Mar. 19, 1968.) In general, any bed of solid particles which is capable of fluidization can be employed as a convertible or semifluidized bed in the manner described in our U.S. Pat. No. 3,374,052. Also described in our prior patent is an apparatus system for operating the convertible beds.

The apparatus includes a vertically-extending column providing a cylindrical bed section supported above a fluid distributor plate or other means for introducing the fluid (gas or liquid) into the bottom of the bed. The top of the bed is restrained by an upwardly movable foraminous plate, which, typically, is a sieve plate. The amount of fluidization occurring in the bed can range from zero fluidization (fixed bed) to total fluidization by lowering or lifting the sieve plate, while the fluid is being introduced at a flow rate greater than the minimum fluidization velocity for the bed. At a given fluidization velocity less than the maximum fluidization velocity, the sieve plate can be lowered to a point where the entire bed is essentially fixed. Then by raising the sieve plate gradually the lowermost portion of the bed is first fluidized, and as the raising of the sieve plate continues, a progressively increasing portion of the bed becomes fluidized. At the same time, the fixed portion of the bed adjacent the underside of the sieve plate becomes progressively smaller until, finally, a condition is reached where the sieve plate exerts no restraint, and the entire bed is fluidized. When the sieve plate is lifted above the fluidized bed to provide a freeboard space therebetween the entire bed becomes fluidized, as in standard fluidized bed operation. In this condition, the only limitation is that the fluid velocity must not exceed the maximum fluidization velocity at which the bed has expanded to the point that it can no longer be maintained as a bed, the particles of the bed near the upper surface being carried out with the fluidizing fluid. These parameters and the method of calculating and/or experimentally determining them are well known in the art of operating fluidized beds.

SUMMARY OF INVENTION

Heretofore it has not been suggested that convertible beds have utility for filtration operations, such as removal of fine particulates suspended in gases or liquids. While porous beds of granular filter media are conventionally used for filtration operations, it has not been recognized that fixed beds of progressively decreasing size would have any value for such operations, since as the bed decreased in size it would have been assumed that filtration capacity would also be reduced. However, when the fixed portion of a filtration bed is used in conjunction with a fluidized portion of the bed, as is possible with convertible or semifluidized beds, unique advantages are obtained. During the filtration cycle, most of the filtered particulates are retained in the fluidized bed portion of increasing size, whereas if the entire bed was fluidized, the particles would be carried out with the gas or liquid exiting from the bed. As the "cake" of filtered particles collects at the bottom of the fixed bed portion, it is broken up by the upward enlargement of the fluidized bed portion, the filtered particles then circulating with the fluidized media of the bed. Moreover, the pressure drop across the fixed bed portion can be maintained relatively uniform.

This novel method of filtration has particular application to difficult filtrations. For example, the method of this invention can be used for hot gas cleaning, such as the removal of particles in the range of 0.5 to 50 microns from emission and product gases of coal and/or oil conversion reactors (gasifiers, combustors, etc.). Insoluble ash and mineral matter can be removed from coal oil obtained from hydrogenation and dissolution of coal, which now represents a major cost contributing operation in such processes. The method has advantageous applications even for more conventional use, such as the filtration of municipal water, where fixed bed filters are now used, such as in the final treatment of filtrate from a continuous filter or the overflow from a primary or secondary settling tank to remove bacteria and suspended BOD. The method of this invention permits a combination of low pressure drop across the filter bed with a relatively high liquid velocity which makes the convertible bed a more effective and efficient means of removing finely suspended materials from waste water than conventional fixed bed filters.

Other applications of the method of this invention are contemplated, which can provide important advantages over presently used filtration procedures. Such applications include air filtration, stack gas cleaning, polymer melt filtration, sewer sludge filtration, and other difficult filtrations.

THE DRAWINGS

The method of this invention is illustrated by the accompanying drawings, in which—

FIG. 1 is a sectional elevational view of a convertible bed filtration apparatus being used for removal of particulates from a fluid, the bed initially being in a nonfluidized essentially fixed state;

FIG. 2 is a sectional elevational view showing the apparatus of FIG. 1 after a cake of filtered particles has begun to collect in the bottom of the fixed bed;

FIG. 3 is another sectional elevational view of the same apparatus illustrating a later stage in the filtration, the lower portion of the bed being in a fluidized state while the upper portion of the bed remains as a fixed bed; and FIG. 4 is another vertical sectional view of the same apparatus illustrating the final stage of the filtration process in which the entire bed has become fluidized for removal of the filtered particles after the conclusion of the filtration.

DETAILED DESCRIPTION

A preferred apparatus for practicing the present invention is known and is described in detail in our prior U.S. Pat. No. 3,374,052, the disclosure of which is incorporated herein by reference. The apparatus illustrated diagrammatically in the drawings of this application is similar to that shown in U.S. Pat. No. 3,374,052. It includes a vertically-extending cylindrical column 10 which provides a cylindrical interior space 11 (see FIG. 1). Within the lower portion of space 11 there is provided a bed of granular filter medium 12 which is supported on a distributor plate 13 provided with a plurality of fluid inlet ports 14. Ports 14 are preferably distributed in a uniform pattern in all directions across the distributor plate. The ports 14 introduce the fluidizing gas or liquid to the filter medium bed 12. Other fluidization inlet means can be employed for introducing the fluidizing gas or liquid.

An enclosed chamber 15 is provided below distributor plate 13. The wall 16 of the chamber may have a conical shape, thereby functioning as a conical-shaped flow regulator. The lower end of chamber 15 is connected to a fluid inlet conduit 17. Above bed 12, there is provided a sieve plate 18 or other perforated plate means for restraining the upper surface of the bed. Plate 18 is provided with a multiplicity of perforations 19, which are preferably distributed over the entire surface thereof. Means are provided for selectively raising and lowering plate 18. In the illustration given, and as more particularly described in U.S. Pat. No. 3,374,052, the lower end of a vertically extending rack bar 20 may be connected to the center of plate 18 by means of a sleeve 21. Bar 20 and the opening within sleeve 21 may conveniently be a square or rectangular cross section, and at least the upper portion of bar 20 provided with teeth 22 on one side thereof. The upper end of column 10 is closed by a cover plate 23, and rack bar 20 projects upwardly beyond cover 23 through a central opening therein. A driving mechanism is connected to the projecting portion of bar 20, including a pinion 24 provided with teeth engaging the teeth of rack 20, the pinion being driven by a shaft 25 connected to an electric motor 26. Suitable controls (not shown) may be provided for operating motor 26, either manually or automatically.

An outlet conduit 27 extends to an opening in cover 23 as shown. Alternatively, an outlet conduit may be provided in the side wall of the upper part of column 10.

To permit pressure conditions within and across bed 12 to be monitored, a series of pressure gauges 28 are provided and connected to suitable pressure taps extending through the side wall of column 10. The pressure gauges shown are designed for manual operation, but in automated versions of the apparatus, more sophisticated pressure sensing and recording apparatus would be employed.

FIG. 1 illustrates a condition which may be employed at the start of the filtration. The bed 12 is fully settled or packed, and plate 18 has been lowered into firm contact with the upper surface of the bed. The entire bed therefore remains fixed and non-fluidized when the fluid containing the particles to be filtered is introduced to the bed through plate 13. It will be understood that a suitable pump for the gas or liquid to be filtered will be used to supply the fluid under pressure to conduit 17 for passage into conical flow regulator 16 and through the ports 14 of the distributor plate. As will be appreciated, the distributor plate ports 14 as well as the sieve plate perforations 19 should be of smaller size (cross-section) than the particle size of the filter medium forming the bed 12 so that the filter medium is retained between the distributor plate and the sieve plate.

For operation of the method of this invention, the velocity of the incoming fluid should be greater than the minimum fluidization velocity for the particular filter medium. In general, the fluid should have an upward velocity of at least two times the minimum fluidization velocity for the bed when unrestrained. Usually, for optimum operation, the upward velocity of the fluid (gas or liquid) should be at least three times the minimum fluidization velocity for the bed when unrestrained. For example, fluidization velocities in the range from about 3 to 10 times the minimum fluidization velocity may be advantageous. As the fluidization velocity is increased to near the maximum fluidization velocity for the unrestrained bed, it will no longer be possible to maintain a portion of the bed in non-fluidized condition, since the particles of the bed will be forced upwardly against the sieve plate, and as the maximum fluidization velocity with reference to the bed and unrestrained condition is reached or passed, the entire bed may revert to an essentially fixed, non-fluidized state. However, for most filter medium material, the range between minimum and maximum fluidization velocities is relatively wide, and therefore a suitable velocity can be readily selected at which by raising the sieve plate the bed can be changed from a fixed state to a semifluidized bed with the size of the lower fluidized portion of the bed progressively increasing.

The method of this invention can be visualized more clearly in connection with the operational sequence illustrated in FIGS. 1 to 4 of the drawings. In a preferred mode of operation, at the start of the filtration, as shown in FIG. 1, the entire bed 12 is maintained as a fixed bed. The fluid containing the particulates to be filtered are introduced at a velocity which would produce total fluidization of the bed if unrestrained by sieve plate 18. However, the initial position of plate 18 is such as to prevent any substantial fluidization of the bed. Since the filter medium of the bed has been selected for its capacity to filter out the particulate material from the fluid, the particulates will be unable to penetrate the bed to any great extent before being stopped by the bed granules. After a short time, as indicated in FIG. 2, a "cake" of fines will begin to be built up in the lower portion of the bed adjacent the distributor 13. The formation of the cake will produce an increased pressure drop across the bed, as can be monitored by the pressure taps at the distributor and the top of the bed. When this pressure rise occurs, motor 26 is actuated, either manually or automatically, to gradually raise plate 18. The mechanical movement of the sieve plate in conjunction with the forces being exerted by the fluid stream will cause disruption of the formed cake of particulates into small fragments. The lower portion of the bed will also begin to be fluidized, and cake disruption will thereby be aided by the fluidization of the particles in the cake-containing portion of the bed. Also, the act of disruption of the existent cake will cause more of the particles which are encased by the cake to become fluidized.

FIG. 3 illustrates an intermediate stage of the process where the bed is being operated as a semi-fluidized bed, the lower portion thereof being in the fluidized state, while the upper portion is an essentially fixed bed.

In the semi-fluidized state of operation, the granules of the filter medium in the lower portion of the bed are subjected to two forces. One of these is the downward gravitational pull which tends to cause the granules to drop from the bed into the fluid stream due to their own weight. Secondly, the granules are being impinged by the force of the fluid stream. The fluid stream striking the lowest layer of the granules cannot continue to flow directly through the bed due to the packing conditions of the granules. Therefore a portion of the fluid will be diverted along the bottom of the bed and exert a sheer force on those granules. The ports or perforations 14 of the distributor separate the fluid stream into numerous jet streams entering the bed, and a considerable turbulent condition will therefore be present along the bottom of the bed caused by the collision of the individual sheer streams. Such turbulence will pull or rip some of the bed granules from the fixed bed into the fluid stream. This causes the granules to become fluidized. This interplay of forces results in a small lower portion of the bed initially becoming fluidized while enough upper pressure is being exerted by the fluid stream to cause the bulk of the bed to be held in the fixed bed state.

As the sieve plate is further lifted, more granules are fluidized due to a decrease in the upward pressure being exerted directly on the fixed bed portion by the fluid stream, that is, an upward pressure will continue to be exerted and maintain the fixed bed region, but due to the fluid stream encountering more fluidized granules in its direct path to the bed, the pressure will be less. This will result in more and more of the bed becoming fluidized as the sieve plate is moved further from the distributor due to the weight of the granules while the fixed portion of the bed becomes correspondingly less.

The foregoing description assumes that the flow rate of the fluid stream is being maintained essentially constant. However, the degree of fluidization at any position of the sieve plate 18 can also be controlled by varying the flow rate of the fluid stream. In general, if the flow rate is insufficient to fluidize the particles, a fixed bed will exist even though plate 11 is not in contact with the upper surface of the bed. As the flow rate increases, two events will occur simultaneously. At a fixed position of the sieve plate located above the packing height, the bed volume will increase due to the upward pressure force being placed on the bed, and the fluid stream will be exerting enough force to fluidize the granules near the distributor while forming a fixed bed below the sieve plate. As the flow rate of the fluid stream increases more of the bed will become fixed, and continued increase of the flow rate will eventually produce a total fixed bed with no granules existing near the distributor, that is, there will be a free space between the bottom surface of the bed and the distributor, the bed being forced upwardly and packed against the sieve plate to produce a fixed bed condition. While this method of operation is possible, it will not usually be employed in connection with the method of filtration of this invention. More conveniently, as indicated above, the fluid containing the particulates can be introduced at an essentially constant velocity several times the minimum fluidization velocity, and the velocity can be maintained throughout the filtration process. It should be understood, however, that where needed to provide an additional control of the process, the fluid flow rate can be increased or decreased, thereby selectively varying the volume of the fixed bed portion in relation to the fluidized bed portion.

While the bed is being operated as a convertible bed, which will be the operating state for most of the filtration process, particulate matter or cake fragments from previously formed filter cakes will circulate with the fluidized bed granules in the lower portion of the bed. At the same time, a "cake" will continue to be formed at the bottom of the fixed bed portion, as illustrated in FIG. 3. As plate 18 continues to be raised, the fluidized bed portion will enlarge, as described above, and increasing quantities of the filtered particulates will be held in the fluidized bed portion, circulating therein with the fluidized granules. The process can be continued until the fixed bed portion represents as little as 5 to 10% of the entire bed, and the trapped "cake" in immediately adjacent sieve plate 18. While the filtration cycle can be terminated at any point, the maximum capacity of the bed can be utilized by continuing the filtration until the particles being filtered begin to be carried out with the gas or liquid through the plate 18. At that time, most of the retained particulates will be in the large volume fluidized bed portion. Because of the expansion of the bed as plate 18 is moved upwardly, the fluidized granules within the bed will be spaced further apart with the spaces between the granules containing the circulating filter particulates. Where the bed is operated to maximum capacity in a filtration cycle, the filtered particulates can fill from 80 to 90% of the volume of the bed at the end of the operating cycle.

Selection of the particular granular filter medium will depend on the filtration operation to be carried out. In general, the medium will be one which is capable of retaining the particulates when the gas or liquid is passed therethrough with the bed in a fixed state. In other words, where a granular filter medium would be suitable for a gravitational filtration for the specific fluid and particles contained therein, it can be used for the purpose of this invention. In accordance with well known principles of fluidization, however, it is preferred that the granules of the filter medium are of relatively uniform size. For filtration purposes, the bed granules will be inert to the fluid being filtered as well as to the filtered solids. The granules in a packed state will serve as a porous filter. The bed may be formed of particles or granules of sand, glass beads, or wide variety of other granular filter media. It will be understood that the density and sizes of the granular medium will be adjusted for the given system to be filtered. The density of the particles, as well as their size and shape, may be varied to control the filtration properties of the bed.

At the conclusion of the filtration cycle, the introduction of the fluid to be filtered is discontinued, and the sieve plate 18 is raised to a position above the top of the bed, such as in the upper portion of column 10. A purging fluid is then introduced through conduit 17 at a sufficient velocity to fluidize the entire bed 12 in a fluidized state. With the sieve plate 18 raised, and the bed completely fluidized, the cake which was in the upper portion of the bed at the conclusion of the filtration will be broken up. As the flow of the purging fluid is continued, the particles being of smaller size and also preferably of lesser density than the granules of the bed will be carried out with the purging fluid. In this way, the bed can be cleaned with substantially complete removal of the filtered particles. Usually, the purging fluid will be a gas where the bed is being used for filtration of particles from the gas, or the purging fluid will be a liquid where the bed is used for liquid filtrations. However, a wide choice of purging fluids is possible, the only requirement being that the purging fluid carries out the particles that have been separated by filtration while leaving the granules in the bed. Should some of the granular material, however, be carried up into the freeboard space, it will be retained by the sieve plate 18, since the perforations therein are of smaller diameter than the bed granules, while being of sufficiently large size to permit the filtered particles to pass therethrough. The purging fluid carrying the filtered particles will thereby be removed through outlet 27, and can be disposed of in any suitable manner.

In carrying out the filtration operation, the raising of plate 18 can be intermittent or continuous. Where the filtration operation is carried out on a relatively standardized basis, plate 18, after formation of the initial filtered cake, can be elevated at a slow continuous rate. It will be important to maintain a sufficient pressure drop across the bed to indicate that a cake is being maintained at the bottom of the fixed bed portion. Where the apparatus is being operated under manual control and observation, the operator can observe the pressure gradients by reading the pressure gauge 28, as the sieve plate is elevated. In large scale commercial operations, of course, automatic control will be provided, and the rate at which plate 18 is raised can be controlled automatically in relation to a pre-set pressure differential. These control features, however, while desirable, are not part of this invention in its broad aspect.

Summarizing, the present invention provides a method of filtering fine particulates from a fluid with a bed of granular filter medium capable of retaining the particulates while permitting the fluid to pass therethrough. In practicing the method, the granular bed is supported over a fluidization distributor within a confined upwardly-extending zone. The upper surface of the bed is restrained with perforated plate means mounted within the zone for positioning at selected elevations therein, the perforations in the plate means being of a smaller size than the granules of the medium. A fluid containing the fine particles to be filtered is passed upwardly through the distributor and the restrained bed. The fluid should have an upward velocity of at least two times the minimum fluidization velocity for the bed when unrestrained. A cake of the particulates is collected in the lower portion of the bed while maintaining the bed from the level of the cake collection upward as a fixed non-fluidized bed. The plate means is progressively raised to form a fluidized bed portion of gradually increasing size below an upper bed portion while continuing to pass the fluid through the bed. The collected particulates are retained as a cake in the fixed bed portion and as circulating solids in the fluidized bed portion. The fluid passes out through the plate means substantially free of the solids. At the conclusion of the filtration, the passing of the fluid is terminated, and the plate means is raised above the bed to provide a freebroad space. A purging fluid is then passed through the distributor in the bed at a velocity fluidizing all of the bed and sweeping the particulates therefrom, the particulates being removed with the purging fluid. Preferably, the perforations of the restraining plate means are of larger size than the particulates, and the purging fluid containing the particulates is removed through the restraining plate. Alternatively, however, an outlet for the purging fluid can be provided below the distributor plate, and this outlet would usually be equipped with a screen or sieve plate in which the perforations are of larger size than the particles being removed with the purging fluid while being of smaller size than the granules of the filter medium.

In a preferred method of operation, at the start of the filtration, the entire bed is essentially in a fixed condition, including the lowermost portion of the bed adjacent the distributor plate. The cake initially formed thereby collects in the lowermost portion of the bed. However, if desired, the filtration operation can be started with the plate means somewhat elevated, permitting a small fluidized bed portion to be formed immediately above the distributor plate. Most of the bed will be in the fixed state, and the initial cake will form at the bottom of the fixed bed portion, even though a small part of the bed is in a fluidized state below the fixed bed portion. The reason for starting the filtration with the entire bed in fixed condition and continuing the filtration until the cake is adjacent the sieve plate is to permit maximum utilization of the capacity of the bed. However, if desired, the entire filtration operation can be carried out with the bed in a semi-fluidized state, the proportion of the bed in the fixed state being progressively decreased.

The method of this invention is further illustrated by the following examples.

EXAMPLE 1

Emission and product gases from coal and/or oil conversion reactors such as gasifiers, combustors, etc., are laden with particulate materials. The small particles, ranging in size from about 0.5 to about 50 microns cannot be removed easily by conventional devices such as cyclones, wet collectors, or electrostatic precipitators. Due to the minute size of these particulate materials, the effective clean-up of gases containing such materials currently presents a major obstacle to the development of advanced power cycle technology in which hot gases from industrial processes are used in high efficiency gas turbine applications.

The method of this invention can deal effectively with this problem. Utilizing bed materials of sand or limestone particles with sizes of the order of 300–1000 microns, the effective removal or particulates of 0.5 to 50 microns can be accomplished. The superficial gas velocity necessary for continuous fluidization in the manner described with reference to FIGS. 1–3 can be three to ten times the minimum fluidization velocity, i.e., a range of 1.0 to 5.0 ft/sec. The openings in the distributor plate and in the sieve plate being of substantially smaller size than the particles forming the bed may range from about 100 to 800 microns, depending on sizes of bed material.

At the onset of operation (see FIG. 1), the gas stream containing particulates enters the fixed bed and the fines are trapped, thus the caking process is initiated. As the caking begins to increase, a pressure drop increase will become evident as monitored by pressure taps at the distributor and at the top of the bed. As the pressure drop increases from the initial value of from 5 to 15 psi/ft., the driving system of the upper sieve plate will be activated, and the sieve will be gradually lifted creating a fluidized bed in the lower portion and a fixed bed in the upper part of the bed matrix. The rate of lifting the upper sieve is adjusted by maintaining an acceptable pressure drop, such as below 25 psi. The fluidized zone is continuously increased while the fixed bed zone is continuously decreased as the sieve plate is continuously lifted. Upon reaching the final stage of filtration (FIG. 4), the feed stream of gas may be shunted to a second bed to reinitiate the filtration process. Two or more beds may be connected so as to provide continuous filtration service. One bed will be used in the filtration cycle while the other bed is being cleaned. The beds may be used alternately in filtering and cleaning modes by simply reversing line control valves, which can be done automatically.

The exhausted bed is then purged of the particulate materials which have been collected in the bed during operating. The purging is carried out simply by lifting the sieve, completely fluidizing the bed, and blowing the fines off with gas. Air is a convenient purging medium, but other gases can be used.

EXAMPLE 2

Coal oil obtained from hydrogenation and dissolution of coal contains a large quantity of insoluble ash and mineral matter. The removal of these particulates represents a major cost contributing operation in this process. Analysis of experimental data for the operation of the convertible beds under heated conditions indicates that the method of this invention affords a highly successful alternative to current separation processes.

The bed matrix used in this system could be composed of a mixture of silica and alumina (density 2.7 g/cc) having a particle size range of 0.01 to 0.5 centimeters. The bed is heated and maintained at about 200° C.–300° C. by electrical heaters affixed to the sides of the bed. As will be understood, the fluidized bed can be heated or pressurized to such a condition that the fluid density and viscosity are adjusted for easier flow through the bed. To affect efficient operation of this system, the velocity of the liquid coal oil may range from a minimum of about 0.003 ft/sec to about 2 ft/sec. The velocity should be at least two to three times the minimum fluidization velocity of the bed. The perforations in the distributor and sieve plate may have sizes ranging from 0.008 to 0.3 centimeters.

Following the onset and progression of filtration, the pressure drop will increase from an initial value of about 2 to 30 psi/ft to about 10 to 45 psi/ft., at which time the upper sieve driving mechanism will be activated to induce fluidization. From this point on, operating procedures will be similar to those previously described. When the top sieve plate is lifted to a height where the bed is mostly fluidized, the flow of coal oil is by-passed. The bed is purged with solvent, such as benzene or toluene, by lifting the sieve completely thus completely fluidizing the bed, and the fines are flushed out.

EXAMPLE 3

Commercial municipal sewage plants currently employ trickle filters composed of beds of sand, diatomaceous earth, coke, charcoal and other inexpensive packing materials for filtration and small scale treatment of dilute wastewater. The best application of such filters is found in the final treatment of filtrate from a continuous filter or the overflow from a primary or secondary settling tank. Such filters under normal conditions can effectively remove bacteria and suspended BOD.

The conventional filter bed of a municipal treatment plant represents a fixed bed operation. If this bed which is normally two feet in depth consisted of sand particles ranging from 0.3 to 0.7 millimeters in size, the pressure drop across the bed would range from 2 to 20 psi. and the flow velocity through the bed would be about 0.007 ft/sec. The pressure drop of a two foot high fluidized bed containing the same size particles is approximately 1.2 psi. This fluidized bed would also be capable of handling a liquid velocity through the bed of 0.03 to 0.2 ft/sec. This combination of a low pressure drop and a relatively high liquid velocity makes the convertible (semi-fluidized) bed a more effective and efficient means of removing finely suspended materials from wastewater than conventional methods.

The driving mechanism for raising the sieve plate is activated when the pressure drop reaches about 5 to 20 psi, and the cycle is completed as before. All other operating procedures are similar to those previously described under hot gas filtration and coal oil filtration.

In contrast with the filtration method of this invention, as illustrated by the foregoing examples, if the filtrations had been carried out in conventional fixed beds, the cake of particulates would accumulate and would be retained at the bottom of the fixed beds with very small penetration into the beds. Once the cake has formed, it will eliminate all of the fines from the filtrate, since the dense cake becomes, in effect, the filter media. However, this simultaneously increases the pressure drop to the point that further filtration becomes impossible, since all the pores will be plugged up by the fines. By way of comparison, with the method of this invention, as the top sieve plate is gradually lifted up, the tightly formed cake is broken up because of gravitational forces, creating a fluidized bed of gradually increasing size below the fixed bed portion. The pressure drop across the filter cake is thereby controlled and prevented from increasing to a level where filtration cannot be continued. Moreover, with this method of operation, the fluid is enabled to penetrate into the fixed bed further. Since the particulate concentration in the fluidized bed section gradually fills up as the filtration progresses, the filter cake will build up more rapidly in the latter stages of the filtration than in the earlier stages. However, this can easily be compensated for by lifting the sieve plate at a progressively more rapid rate, either continuously, or intermittently. Where the pressure drop across the filter cake and the fixed bed portion is maintained relatively constant, the more rapid build up of the filter cake will automatically be compensated for. This method of operation is therefore ideally suited to automatic control mechanisms.

We claim:

1. The method of filtering fine particulates from a fluid with a bed of granular filter medium capable of retaining the particulates while permitting the fluid to pass therethrough, comprising:
   (a) supporting said granular bed within a confined upwardly-extending zone above a fluidization inlet;
   (b) restraining the upper surface of said bed with a perforated plate for retaining said filter medium within said zone while permitting fluid to pass therethrough, said plate being mounted within said zone for positioning at selected elevations therein and the perforations in said plate being of smaller size than the granules of said medium;
   (c) passing upwardly through said inlet and said restrained bed a fluid containing the fine particulates to be filtered, said fluid having an upward velocity of at least two times the minimum fluidization velocity for said bed when unrestrained;
   (d) collecting a cake of said particulates in a lower portion of said bed while maintaining said bed from the level of said cake collection upward as a fixed non-fluidized bed;
   (e) continuously or intermittently breaking up the lower portion of said cake by raising said plate and decreasing the downward extent of said fixed bed portion while continuing to pass said fluid through said bed, said fixed bed portion progressively decreasing in downward extent and a fluidized bed portion being provided therebeneath of progressively increasing size, said cake being reformed by the collection of said particulates in said fixed bed portion as it decreases in downward extent and the broken up cake being retained as circulating solids in said increasing fluidized bed portion;

(f) terminating the passing of said fluid and raising said plate above said bed to provide a freeboard space thereabove; and (g) passing a purging fluid through said bed at a velocity fluidizing all of said bed and sweeping said particulates therefrom, said particulates being removed with said purging fluid.

2. The method of claim 1 further characterized by also maintaining the lowermost portion of said bed during the initial phase of said filtration in fixed non-fluidized condition, said cake being initially collected in said lowermost bed portion.

3. The method of claim 1 in which said fluid is a liquid.

4. The method of claim 1 in which said fluid is a gas.

5. The method of filtering fine particles suspended in a liquid wherein there is employed a bed of a granular filter medium capable of retaining the particles while permitting the liquid to pass therethrough, comprising:

(a) supporting said granular bed within a confined upwardly-extending zone above a fluidization inlet;

(b) restraining the upper surface of said bed with a perforated plate for retaining said filter medium within said zone while permitting liquid to pass therethrough, said plate being mounted within said zone for positioning at selected elevations therein and the perforations in said plate being of smaller size than the granules of said medium;

(c) passing upwardly through said inlet and said restrained bed a liquid containing the fine particles to be filtered, said liquid having an upward velocity of at least three times the minimum fluidization velocity for said bed when unrestrained, the said perforations of said restraining plate being of larger size than said particles;

(d) initially collecting a cake of said particles in the lowermost portion of said bed while maintaining said bed as a fixed non-fluidized bed;

(e) continuously or intermittently breaking up the lower portion of said cake by raising said plate and decreasing the downward extent of said fixed bed portion while continuing to pass said liquid through said bed, said fixed bed portion progressively decreasing in downward extent and a fluidized bed portion being provided therebeneath of progressively increasing size, said cake being reformed by the collection of said particles in said fixed bed portion as it decreases in downward extent and the broken up cake being retained as circulating solids in said increasing fluidized bed portion;

(f) terminating the passing of said liquid and raising said plate above said bed to provide a freeboard space thereabove; and (g) passing a purging liquid through said bed at a velocity fluidizing all of said bed and sweeping said particles therefrom, said particles being removed with said purging liquid through said plate.

6. The method of claim 5 further characterized in that said filtration is continued until said cake is being formed in the portion of said bed adjacent said plate, and said particles are beginning to be carried out with said liquid through said plate.

7. The method of filtering fine particles suspended in a gas wherein there is employed a bed of a granular filter media capable of retaining the particles while permitting the gas to pass therethrough, comprising:

(a) supporting said granular bed within a confined upwardly-extending zone above a fluidization inlet;

(b) restraining the upper surface of said bed with a perforated plate for retaining said filter medium within said zone while permitting gas to pass therethrough, said plate being mounted within said zone for positioning at selected elevations therein and the perforations in said plate being of smaller size than the granules of said medium;

(c) passing upwardly through said inlet and said restrained bed a gas containing the fine particles to be filtered, said gas having an upward velocity of at least three times the minimum fluidization velocity for said bed when unrestrained, the said perforations of said restraining plate being of a larger size than said particles;

(d) initially collecting a cake of said particles in the lowermost portion of said bed while maintaining said bed as a fixed non-fluidized bed;

(e) continuously or intermittently breaking up the lower portion of said cake by raising said plate and decreasing the downward extent of said fixed bed portion while continuing to pass said gas through said bed, said fixed bed portion progressively decreasing in downward extent and a fluidized bed portion being provided therebeneath of progressively increasing size, said cake being reformed by the collection of said particles in said fixed bed portion as it decreases in downward extent and the broken up cake being retained as circulating solids in said increasing fluidized bed portion;

(f) terminating the passage of said gas and raising said plate above said bed to provide a freeboard space thereabove; and (g) passing a purging gas through said bed at a velocity fluidizing all of said bed and sweeping said particles therefrom, said particles being removed with said purging gas through said plate.

8. The method of claim 7 further characterized in that said filtration is continued until said cake is being formed in the portion of said bed adjacent said plate and said particles are beginning to be carried out with said gas through said plate.

* * * * *